May 4, 1965 A. I. FRANK 3,182,320
AUTOMATIC RANGE AND AZIMUTH TRACK WHILE SCAN SYSTEM
Filed June 29, 1960 2 Sheets-Sheet 2
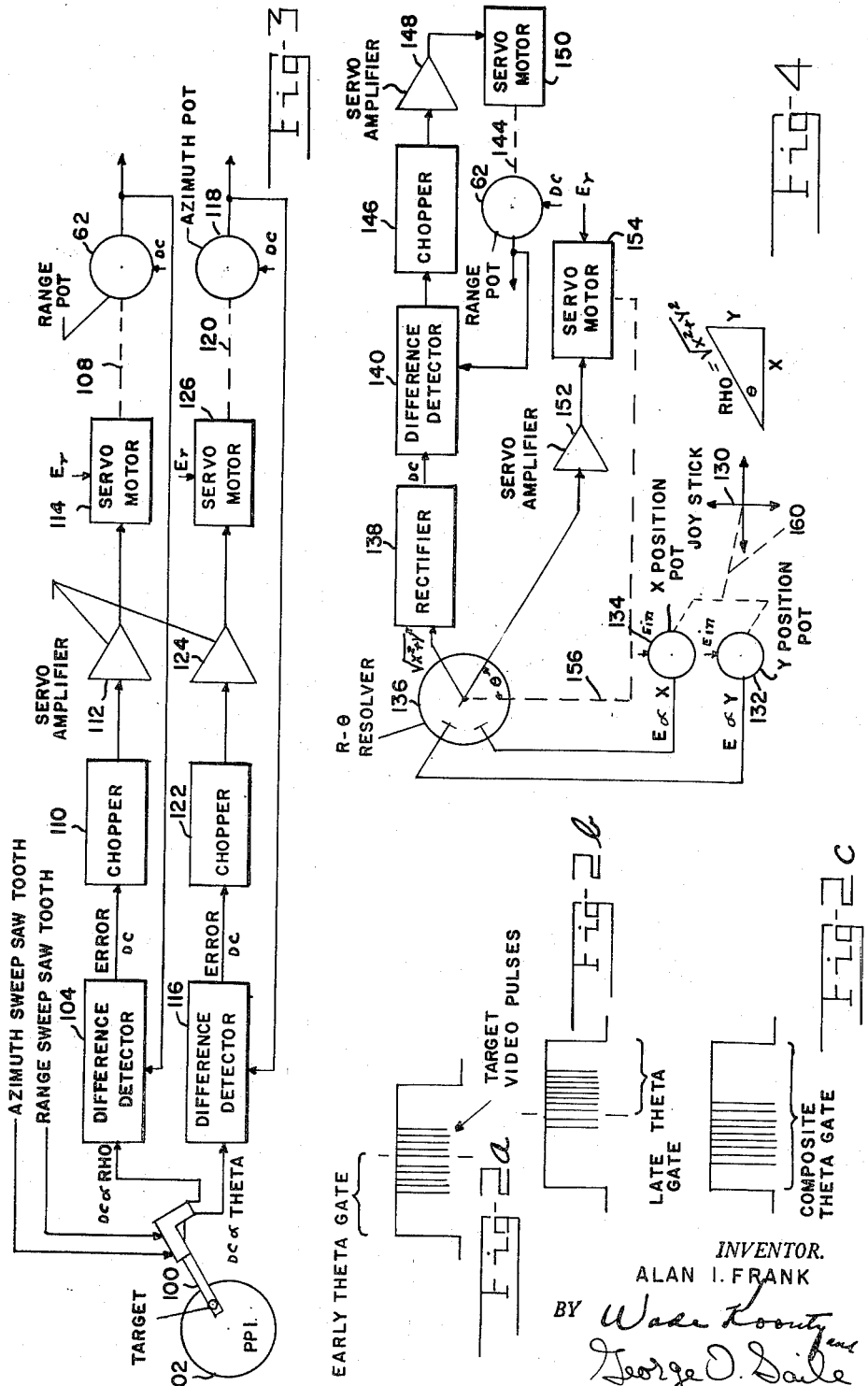
INVENTOR.
ALAN I. FRANK
BY
ATTORNEYS

United States Patent Office 3,182,320
Patented May 4, 1965

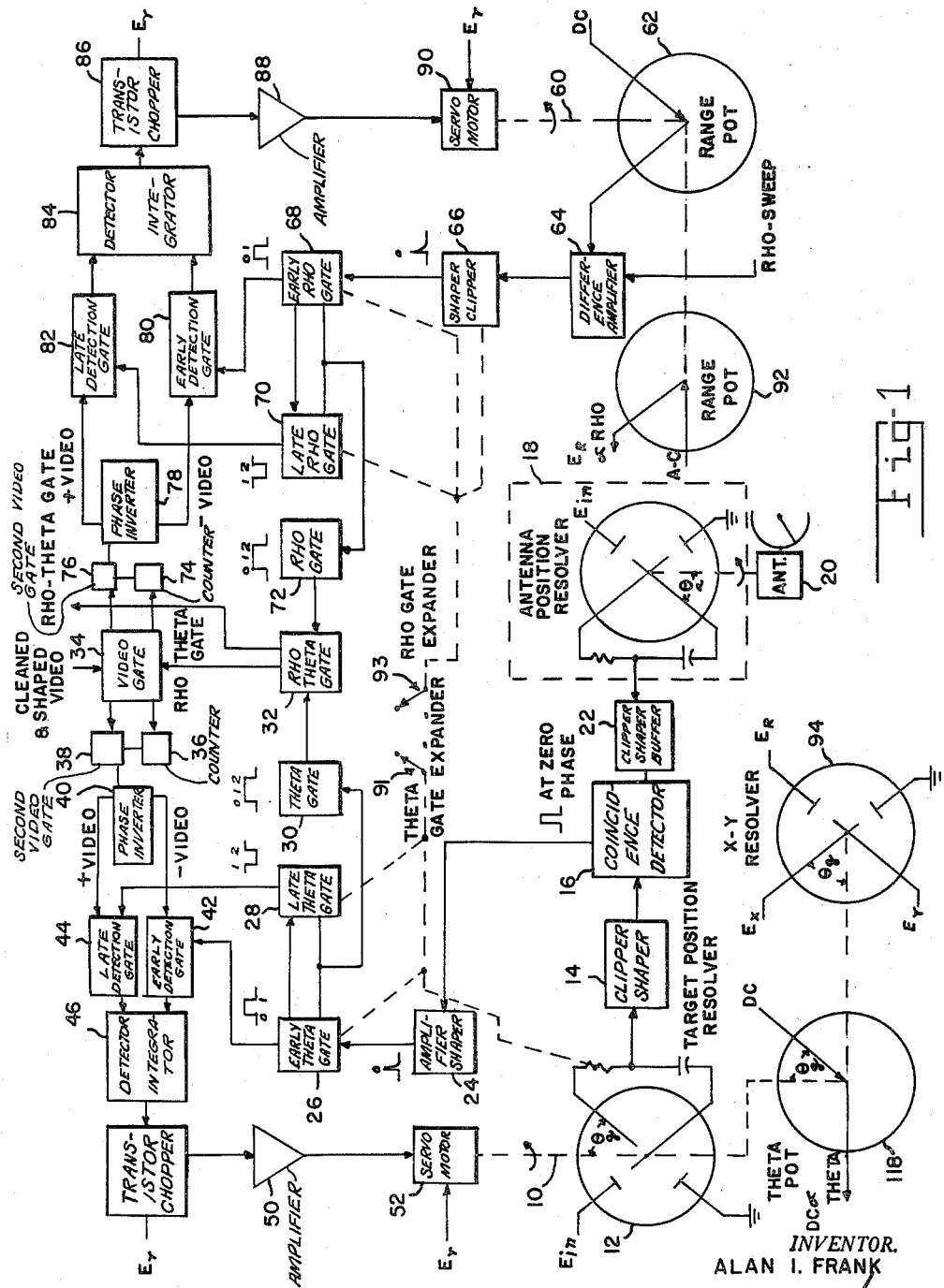

3,182,320
AUTOMATIC RANGE AND AZIMUTH TRACK
WHILE SCAN SYSTEM
Alan I. Frank, Philadelphia, Pa., assignor to the United States of America as represented by the Secretary of the Air Force
Filed June 29, 1960, Ser. No. 39,753
1 Claim. (Cl. 343—7.3)

The present invention relates to improved means and techniques for tracking objects in flight and, in particular, relates to means and techniques for tracking aircraft in their approach zone to a landing field while a radar antenna beam scans such a zone.

A planned position indicator is standard equipment with surveillance radar systems and provides a scan presentation in polar coordinates of the area being covered, with the antenna position occupying the center of the screen. Targets appear as moving light spots on the indicator screen. To provide a means by which continuous tracking of a moving target within the purview of the antenna without causing the surveillance antenna to be aimed continuously at the moving target and using information derived solely from the use of the antenna would greatly simplify existing surveillance-tracking radar systems.

It is thus an object of this invention to provide an improved system for tracking in both range and azimuth while continuing circular scan.

It is another object of this invention to provide a system using tracking gates capable of tracking an aircraft target from information derived from a search radar.

It is a further object of this invention to provide a system wherein a photocell probe target selector and associated circuitry is used to pick up and lock-on a target representation on the plan position indicator, and tracking gate means for comparing incoming target video with previous target position representations and correcting the previous representations with present target information.

It is a still further object of this invention to provide a system wherein a joy stick and associated circuitry is used to pickup and lock-on a target representation on the plan position indicator, and tracking gate means for comparing incoming target video with previous target position representations and correcting the previous representations with present target information.

The nature of the invention, further objects and advantages will appear more fully by consideration of the embodiments illustrated, from the accompanying drawings and hereinafter to be described.

In the drawings:

FIGURE 1 is a block diagram of the tracking gate system for tracking a target in range and azimuth while continuing circular scan;

FIGURES 2a, b and c illustrates the possible positions of the target video pulses within the tracking gate;

FIGURE 3 is an external target position means for assigning a target to the tracking system of FIGURE 1; and, FIGURE 4 is another external target position means for assigning a target to the tracking system of FIGURE 1.

Each tracking gate is made up of a rho or range gate and a theta or azimuth gate. Each of these gates is a closed-loop electromechanical system. Let us assume that the acquisition of a target has been completed, that is, the tracking gate has been assigned to a particular target.

During the acquisition of the target, a shaft position is imposed upon a theta gate shaft 10. This shaft position, $\theta_t$, corresponds to the theta position of the target.

On the theta gate shaft 10, a target position resolver 12 has been turned an angle $\theta_t$. The output of this resolver, which is used as a phase shifter, is $E_{in} \angle \theta_t$, where $E_{in}$ equals the input voltage and $\theta_t$ is the introduced target theta position. The theta gate width is $\theta_g$; and, in order to position the gate about the target, the gate will have to be initiated one-half $\theta_g$ before the target position. At this point then the resolver output is phase-shifted at this angle, one-half $\theta_g$, and the output becomes $$E_{in} \angle \theta_t - \frac{\theta_g}{2}$$

This voltage is then clipped and shaped by clipper-shaper 14 and fed to the coincidence detector 16.

An antenna position resolver 18 is turned continuously at the identical speed of the radar antenna 20 by use of synchros. The antenna position resolver is used as a phase shifter, and the output is $E_{in} \angle \theta_a$ where $E_{in}$ is the input voltage and $\theta_a$ the antenna position. The output of the antenna resolver is clipped and shaped by clipper-shaper-buffer 22 and fed to the coincidence detector 16.

There are then two pulse trains, one from the antenna position resolver 18 and another from the target position resolver 12, entering the coincidence detector. The target position has a constant phase or time position, $\theta_t - \theta_g/2$. The antenna position pulse phase or time position is varying at a constant rate determined by the antenna scanning rate. When the antenna position $\theta_a$, equals the theta gate starting position $\theta_t - \theta_g/2$, the coincidence detector 16 will put out a pulse.

The pulse is cleaned and shaped for use as a trigger by means of an amplifier-shaper 24. This pulse represents the start of the theta or azimuth gate and will trigger the early theta gate means 26. The early theta gate means 26 delivers a differentiated and clipped pulse to form a trigger for the late theta gate means 28 which initiates the late theta gate.

The outputs of the early and late theta gate means 26 and 28, respectively, are combined to form the complete theta gate in the theta gate means 30. Finally, the theta gate and the rho gate, derived from the rho gate system, are combined to form the composite rho-theta tracking gate in the rho-theta gate means 32. The composite rho-theta gate is used to gate the video entering the system.

Video gate means 34 for continuously supplying cleaned and shaped video, including video pulses from said target, is gated by the rho-theta or range-azimuth gate means 32. The gated video is fed to counter 36 and to a second video gate 38 in the theta gate system. The counter samples three consecutive video returns before gating "on" the second video gate. The gated video is inverted by a phase inverter 40 and passes on to the detection gates.

There are two detection gates, an early detection gate 42 and a late detection gate 44. The early detection gate is fed with video of negative polarity and is gated by the early theta gate pulse derived from early theta gate means 26. When video appears during the early gate, the video is passed to the detector-integrator 46. Detection and integration of these pulses yields a negative voltage. The positive video is fed into the late detection gate 44. The video is gated by the late theta gate pulse derived from the late theta gate means 28 and when present is passed to the detector-integrator. When video is present during the late gate, the detector-integrator 46 puts out a positive voltage.

If the theta gate is centered about the target, as in FIGURE 2a, equal number of video pulses will appear on the output of the detection gates and the detector-integrator 46 will have a resultant output of zero. If the gate leads the target, as in FIGURE 2b, more video will appear during the late gate and the positive error signal will appear on the output of the detector-integrator 46. If the gate is lagging the target, as in FIGURE 2c, more video will appear in the early gate and the error signal will be more negative.

The resultant error signal from the detector-integrator 46 is used to control the output of a transistor chopper circuit 48 supplied with an alternating current voltage $E_r$. As the direct current error signal polarity is reversed, the alternating current signal produced by the chopper 48 undergoes a 180° phase reversal.

The chopper 48 is followed by an alternating current amplifier 50, which drives one phase of a servo-motor 52 simulary supplied with an alternating current voltage $E_r$. The direction of rotation of the servo-motor 52 is determined by the phase of the alternating current input signal. If an error signal is present, the motor gives the theta gate shaft 10 a new position, thus the target position resolver 12 output voltage phase or time position is changed. The correction process of the closed loop system repeats itself until the error signal is reduced to zero, that is, the tracking gate is centered in azimuth about the target.

The above discussion shows the tracking gate system operation for a stationary target. A constant velocity target will cause an average direct current velocity signal voltage to appear at the output of the detector-integrator 46. This will cause the theta gate shaft 10 to be driven in a constant velocity.

During the acquisition of the target, a shaft position is imposed upon the rho or range gate shaft 60. This shaft position determines the position of the range potentiometer 62 and hence, the direct current voltage out of the potentiometer on line to a difference amplifier 64. This direct current voltage is proportional to the range or rho position of the target. The difference amplifier 64 compares the range sweep wave form and the direct current voltage proportional to range. The difference signal is full wave rectified in the difference amplifier and the resulting signal is a train of upside-down triangle pulses.

The signal is fed into a shaper-clipper 66 where the bottom part of the triangle pulse is clipped to a specified level. The remaining signal is amplified and clipped to produce a rectangular pulse. This pulse is differentiated and clipped so that the resulting voltage is a trigger pulse. This trigger pulse represents the start of the rho or range gate and will trigger the early rho gate means 68. The early rho gate means 68 delivers a differentiated and clipped pulse to form a trigger for the late rho gate means 70 which initiates the late rho gate. The early and late gates are combined in the rho gate means 72 to form a complete rho gate. The rho gate and the theta gate, derived from the theta gate system, form the composite rho-theta tracking gate in the rho-theta gate means 32.

The input video is gated by rho-theta gate means in the common video circuitry. The gate video is fed to a counter 74 and a second video gate means 76 in the rho closed loop system. The counter 74 samples three consecutive video returns and then gates a second video gate "on." This gated video is inverted by the phase inverter 78 and passed on to the detection gates.

As in the theta gate system, there are two detection gates in the rho gate system. An early detection gate 80 samples negative video during the early rho gate and the late detection gate 82 samples positive video during the late rho gate. Video appearing in either gate is passed on to the detector-integrator 84.

If more video appears during the early gate, as in FIGURE 2c, the resultant direct current voltage out of the detector integrator 84 will be negative. If more video appears during the late gate, as in FIGURE 2b, the resultant direct current voltage will be positive. If the video overlaps the two gates equally, the tracking gate is centered about the target, as in FIGURE 2a, and the resultant direct current output voltage will be zero.

The resultant direct current signal is an error signal and it is used to control the output of a transistor chopper circuit 86 provided with an alternating current voltage $E_r$. As the direct current error signal polarity is reversed, the alternating current signal produced by the chopper 86 undergoes a 180 degree phase reversal. The chopper is followed by an alternating current amplifier 88 which drives one phase of a servo motor 90 to which an alternating current voltage $E_r$ is similarly applied. The direction of rotation of servo motor 90 is determined by the phase of the alternating current input signal. If an error signal is present, the motor gives the rho gate shaft 60 a new position; thus the direct current output of the range potentiometer 62 is changed. The correction process of the closed loop repeats itself until the error signal is reduced to zero, that is, the tracking gate is centered in range about the target.

When the target is a constant velocity target, the output of the detector-integrator 84 will be an average direct current velocity signal voltage. This voltage will cause the rho-gate shaft to be driven at a constant velocity.

Tracking gate expanders for both the early and late theta gates, and the early and late rho gates, can be used in the system to alter the width of the tracking gates. The theta gate expander 91 is mechanically linked to a variable resistor in the target position resolver 12. The rho gate expander 93 is mechanically linked to the shaper-clipper 66.

An alternating current voltage proportional to range is derived from a second range potentiometer 92 on the rho gate shaft. This voltage, $E_R$, is used as an input to an X–Y resolver 94 which is mounted on the theta shaft. The resolver 94 is used as a coordinate converter, that is, the resolver takes the rho-theta or range-azimuth information and converts this information to X–Y coordinate information. Direct current voltages proportional to the X–Y positions are gotten by rectifying the resolver's X–Y output voltages. These voltages are produced continuously and represent the actual position of the aircraft target. It should be noted that the voltages $E_r$ and $E_R$ are not the same, the former merely being an alternating current voltage and the latter being a voltage proportional to range.

Initially a tracking gate must be assigned to a target. By positioning the shafts in the rho and theta gate systems to the proper positions, the target location will be introduced to the system. After lock-on, the target video introduced into a closed-loop servo system will keep the gate positioned about the target. The lock-on of a gate may be accomplished by either of two systems, the photocell light gun or the joy stick.

Referring now more particularly to FIGURE 3, if the photocell light gun 100 is held over the target on the plan position indicator 102, the target will be picked up in the form of a light pulse. Azimuth and range sweep sawtooths are continuously fed into the light gun. The instant the video pulse appears, the azimuth and range sawtooths are frozen. The direct current voltages resulting are then proportional to azimuth or theta and range or rho. Both the rho and theta systems have special closed-loop systems to facilitate lock-on.

The rho loop starts with a difference amplifier or detector 104. The reference range voltages from the light gun 100 and a direct current voltage from the range potentiometer 62 on the rho gate shaft 108 are fed into the difference amplifier 104. The difference voltage is an error signal which controls the output of the transistor chopper 110. The direct current output from the chopper 110 varies in phase depending upon the polarity of the error signal. Following the chopper is an alternating current amplifier 112 which drives one phase of a servo motor 114. The motor positions the shaft 108 so there is zero error in the loop, that is, the range potentiometer voltage ent than the theta potentiometer voltage, which is mounted is equal to the reference range voltage supplied by the light gun 100.

The theta system has a similar configuration. A difference amplifier 116 is included in the theta system just for lock-on. Difference or error signals are developed when the azimuth reference voltage from the light gun is different on the theta gate shaft 120. The error signal controls a transistor chopper 122 and alternating current amplifier 124 combination which drives a servo motor 126. The theta gate shaft 120 is positioned so that zero error is present in the loop, that is, the theta potentiometer 118 voltage is equal to the reference azimuth voltage supplied by the light gun.

When the operation of both the rho system and the theta system is complete, the regular tracking gate loop is closed for automatic tracking.

The joy stick external target positioning system, illustrated in FIGURE 4, is essentially two potentiometers 132 and 134, one supplying a voltage proportional to the X position and the other a voltage proportional to the Y position. The X-Y coordinate information from the joy stick 130, must be converted to the R-θ information, since the system of the invention uses rho-theta coordinate information. A mechanical connection linking the joy stick 130 with the X- and Y-coordinate potentiometers 132 and 134 is shown herein conventionally by a dashed line 160 whereby in a suitable known manner X- and Y-coordinate voltages may be generated. A resolver 136 connected to perform vector addition will convert the X-Y information to R-θ information. An alternating current voltage proportional to X and an alternating current voltage proportional to Y are fed into the resolver 136. The one output will be a voltage proportional to $\sqrt{X^2+Y^2}$ or rho. The other voltage will be proportional to theta.

The $\sqrt{X^2+Y^2}$ or rho voltage is rectified in rectifier 138 and fed into a difference detector or amplifier 140. A direct current voltage from the range potentiometer 62, which is on the rho gate shaft 144, is also fed to the difference amplifier 140. The difference voltage or error signal controls the output of a chopper 146 and alternating current amplifier 148 combination which, in turn, controls a servo motor 150. The motor turns the rho gate shaft 144 so as to reduce the loop error to zero, that is, the range potentiometer voltage is equal to the reference range voltage.

The theta voltage from the resolver 136 is fed directly into a servo amplifier 152 which drives a servo motor 154. This loop positions the resolver 136, or theta gate shaft 156, to correspond to the angle, $$\theta = \tan^{-1} \frac{Y}{X}$$

When the rho and theta shaft positions are set to correspond to the target bearings, the regular tracking gate loop is closed for automatic tracking.

The invention is not intended to be limited to the examples of the embodiment shown and described, but may on the contrary, be capable of many modifications without departing from the spirit of the invention.

I claim:

A system for tracking a target from azimuth and range information derived from a continuously rotating directional antenna system comprising: means for locking on the said target; azimuth and range gate shafts; first and second servo means responsive to the locking means signals and connected to said azimuth and range gate shafts, respectively, for positioning the original target location on said azimuth and range shafts; a target position resolver on said azimuth shaft for producing an output voltage proportional to said azimuth shaft position; an antenna position resolver connected to said antenna system for producing an output voltage proportional to the position in azimuth of said target; first means coupled to the said target position resolver and said antenna position resolver for comparing said azimuth positions of said resolvers, initiating an azimuth tracking gate at a time just prior to the instant that the said antenna is directed toward the position set on the said azimuth shaft, and terminating the said azimuth tracking gate at a time such that the portion of the azimuth tracking gate prior to the instant the antenna is directed to the said shaft position is identical to that portion thereafter; means for sweeping the range for which said antenna is effective; second means actuated by said sweeping means and said range shaft for initiating a range tracking gate at a time just prior to the instant that the said range sweep is at the position set on said range shaft and terminating said range tracking gate at a time such that the portion of the range tracking gate, prior to the instant that the range sweep is at the said shaft position, is identical to the portion thereafter; video gate means coupled to said first and second means for gating video obtained by said antenna system with a composite azimuth and range tracking gate whereby the video gated will include target video; azimuth error signal generating means coupled to said video gating means for producing a single output error voltage proportional in magnitude to the error in position from center of the said target video within said azimuth tracking gate; said first servo means coupling said azimuth error signal generating means to said azimuth gate shaft for correcting the azimuth shaft position; range error signal generating means coupled to said video gating means for producing a single output error voltage proportional in magnitude to the error position from center of the said target video within said range tracking gate; and said second servo means coupling said range error signal generating means to said range gate shaft for correcting the range shaft position.

References Cited by the Examiner

UNITED STATES PATENTS

| | | | |
|---|---|---|---|
| 2,516,765 | 7/50 | Ferrell | 343—7.4 X |
| 2,698,932 | 1/55 | Wathan | 343—7.4 |
| 2,849,707 | 8/58 | White | 343—7.3 |
| 2,866,966 | 12/58 | White | 343—7.3 |
| 2,995,744 | 8/61 | Covely | 343—7.4 |
| 3,064,250 | 11/62 | Close | 343—7.3 |

CHESTER L. JUSTUS, *Primary Examiner.*